United States Patent
Malla

(10) Patent No.: US 12,065,167 B2
(45) Date of Patent: Aug. 20, 2024

(54) SYSTEM AND METHOD FOR COMPLETING JOINT RISK LOCALIZATION AND REASONING IN DRIVING SCENARIOS

(71) Applicant: Honda Motor Co., Ltd., Tokyo (JP)

(72) Inventor: Srikanth Malla, Sunnyvale, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 371 days.

(21) Appl. No.: 17/388,256

(22) Filed: Jul. 29, 2021

(65) Prior Publication Data
US 2022/0371622 A1 Nov. 24, 2022

Related U.S. Application Data

(60) Provisional application No. 63/191,581, filed on May 21, 2021.

(51) Int. Cl.
*B60W 60/00* (2020.01)
*B60W 10/30* (2006.01)
(Continued)

(52) U.S. Cl.
CPC ........ *B60W 60/0015* (2020.02); *B60W 10/30* (2013.01); *B60W 40/04* (2013.01);
(Continued)

(58) Field of Classification Search
CPC ........... B60W 10/30; B60W 2050/146; B60W 2420/42; B60W 40/04; B60W 50/14;
(Continued)

(56) References Cited

U.S. PATENT DOCUMENTS

| 11,577,757 B2* | 2/2023 | Malla | B60W 60/00272 |
| 11,702,111 B2* | 7/2023 | Young | B60W 60/0053 701/1 |

(Continued)

FOREIGN PATENT DOCUMENTS

| EP | 3612425 B1 * | 1/2023 | ............ B60W 50/02 |
| JP | 2020042808 | 3/2020 | |

OTHER PUBLICATIONS

Stefano Alletto, Andrea Palazzi, Francesco Solera, Simone Calderara, and Rita Cucchiara. Dr (eye) ve: a dataset for attention-based tasks with applications to autonomous and assisted driving. In Proceedings of the IEEE conference on computer vision and pattern recognition workshops, pp. 54-60, 2016.

(Continued)

*Primary Examiner* — Babar Sarwar
(74) *Attorney, Agent, or Firm* — RANKIN, HILL & CLARK LLP

(57) ABSTRACT

A system and method for completing joint risk localization and reasoning in driving scenarios that include receiving a plurality of images associated with a driving scene of an ego agent. The system and method also include inputting image data associated with the plurality of images to an encoder and inputting concatenated features to a decoder that identifies at least one of: an important traffic agent and an important traffic infrastructure that is located within the driving scene of the ego agent. The system and method further include controlling at least one system of the ego agent to provide a response to account for the at least one of: the important traffic agent and the important traffic infrastructure that is located within the driving scene of the ego agent.

18 Claims, 10 Drawing Sheets

(51) Int. Cl.
    *B60W 40/04*     (2006.01)
    *B60W 50/14*     (2020.01)
    *G06F 18/21*     (2023.01)
    *G06N 3/08*     (2023.01)
    *G06T 7/246*     (2017.01)
    *G06V 20/56*     (2022.01)

(52) U.S. Cl.
CPC ............. *B60W 50/14* (2013.01); *G06F 18/21* (2023.01); *G06N 3/08* (2013.01); *G06T 7/246* (2017.01); *G06V 20/56* (2022.01); *B60W 2050/146* (2013.01); *B60W 2420/403* (2013.01); *G06T 2207/30196* (2013.01); *G06T 2207/30236* (2013.01); *G06T 2207/30252* (2013.01); *G06V 2201/08* (2022.01)

(58) Field of Classification Search
CPC .. B60W 60/0015; G06F 18/21; G06N 3/0442; G06N 3/0455; G06N 3/08; G06N 3/09; G06N 5/04; G06T 2207/30196; G06T 2207/30236; G06T 2207/30252; G06T 7/246; G06V 10/25; G06V 10/82; G06V 20/56; G06V 20/58; G06V 2201/08
See application file for complete search history.

(56) References Cited

U.S. PATENT DOCUMENTS

| | | | | |
|---|---|---|---|---|
| 2019/0152490 | A1* | 5/2019 | Lan | G06V 20/58 |
| 2019/0367019 | A1* | 12/2019 | Yan | B60W 30/09 |
| 2020/0089246 | A1* | 3/2020 | McGill, Jr. | G05D 1/0214 |
| 2021/0261167 | A1* | 8/2021 | Kum | B60W 60/00276 |
| 2022/0055643 | A1* | 2/2022 | Young | G05D 1/0088 |
| 2022/0204016 | A1* | 6/2022 | Lerner | B60W 60/0059 |
| 2022/0363266 | A1* | 11/2022 | Yasuda | B60W 40/09 |
| 2023/0020040 | A1* | 1/2023 | Tam | G08G 1/0141 |
| 2023/0150550 | A1* | 5/2023 | Shi | B60W 60/0015 701/23 |

OTHER PUBLICATIONS

Ashish Tawari, Praneeta Mallela, and Sujitha Martin. Learning to attend to salient targets in driving videos using fully convolutional rnn. In 2018 21st International Conference on Intelligent Transportation Systems (ITSC), pp. 3225-3232. IEEE, 2018.

Peter Anderson, Basura Fernando, Mark Johnson, and Stephen Gould. Spice: Semantic propositional image caption evaluation. In European conference on computer vision, pp. 382-398. Springer, 2016.

Stanislaw Antol, Aishwarya Agrawal, Jiasen Lu, Margaret Mitchell, Dhruv Batra, C Lawrence Zitnick, and Devi Parikh. Vqa: Visual question answering. In Proceedings of the IEEE international conference on computer vision, pp. 2425-2433, 2015.

Satanjeev Banerjee and Alon Lavie. Meteor: An automatic metric for mt evaluation with improved correlation with human judgments. In Proceedings of the acl workshop on intrinsic and extrinsic evaluation measures for machine translation and/or summarization, pp. 65-72, 2005.

Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving. In Proceedings of the IEEE/CVF conference on computer vision and pattern recognition, pp. 11621-11631, 2020.

Fu-Hsiang Chan, Yu-Ting Chen, Yu Xiang, and Min Sun. Anticipating accidents in dashcam videos. In Asian Conference on Computer Vision, pp. 136-153. Springer, 2016.

Kan Chen, Rama Kovvuri, and Ram Nevatia. Query-guided regression network with context policy for phrase grounding. In Proceedings of the IEEE International Conference on Computer Vision, pp. 824-832, 2017.

Roberto Cipolla, Yarin Gal, and Alex Kendall. Multi-task learning using uncertainty to weigh losses for scene geometry and semantics. In Proceedings of the IEEE Conference on Computer Vision and Pattern Recognition, pp. 7482-7491, 2018.

Marcella Cornia, Matteo Stefanini, Lorenzo Baraldi, and Rita Cucchiara. Meshed-memory transformer for image captioning. In Proceedings of the IEEE/CVF Conference on Computer Vision and Pattern Recognition, pp. 10578-10587, 2020.

Bo Dai, Sanja Fidler, Raquel Urtasun, and Dahua Lin. Towards diverse and natural image descriptions via a conditional gan. In Proceedings of the IEEE International Conference on Computer Vision, pp. 2970-2979, 2017.

Thierry Deruyttere, Simon Vandenhende, Dusan Grujicic, Luc Van Gool, and Marie-Francine Moens. Talk2car: Taking control of your self-driving car. arXiv preprint arXiv:1909.10838, 2019.

Jianwu Fang, Dingxin Yan, Jiahuan Qiao, and Jianru Xue. Dada: A large-scale benchmark and model for driver attention prediction in accidental scenarios. arXiv preprint arXiv:1912.12148, 2019.

Mingfei Gao, Ashish Tawari, and Sujitha Martin. Goal-oriented object importance estimation in on-road driving videos. In 2019 International Conference on Robotics and Automation (ICRA), pp. 5509-5515. IEEE, 2019.

Ross Girshick. Fast r-cnn. In Proceedings of the IEEE international conference on computer vision, pp. 1541440-1448, 2015.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Ronghang Hu, Huazhe Xu, Marcus Rohrbach, Jiashi Feng, Kate Saenko, and Trevor Darrell. Natural language object retrieval. In Proceedings of the IEEE Conference on Computer Vision and Pattern Recognition, pp. 4555-4564, 2016.

Yiqing Huang, Jiansheng Chen, Wanli Ouyang, Weitao Wan, and Youze Xue. Image captioning with end-to-end attribute detection and subsequent attributes prediction. IEEE Transactions on Image Processing, 29:4013-4026, 2020.

Eddy Ilg, Nikolaus Mayer, Tonmoy Saikia, Margret Keuper, Alexey Dosovitskiy, and Thomas Brox. Flownet 2.0: Evolution of optical flow estimation with deep networks. In Proceedings of the IEEE conference on computer vision and pattern recognition, pp. 2462-2470, 2017.

Justin Johnson, Andrej Karpathy, and Li Fei-Fei. Densecap: Fully convolutional localization networks for dense captioning. In Proceedings of the IEEE conference on computer vision and pattern recognition, pp. 4565-4574, 2016.

Jinkyu Kim and John Canny. Interpretable learning for self-driving cars by visualizing causal attention. In Proceedings of the IEEE international conference on computer vision, pp. 2942-2950, 2017.

Jinkyu Kim, Teruhisa Misu, Yi-Ting Chen, Ashish Tawari, and John Canny. Grounding human-to-vehicle advice for self-driving vehicles. In Proceedings of the IEEE/CVF Conference on Computer Vision and Pattern Recognition, pp. 10591-10599, 2019.

Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. International journal of computer vision, 123(1):32-73, 2017.

Alex Krizhevsky, Ilya Sutskever, and Geoffrey E Hinton. Imagenet classification with deep convolutional neural hetworks. Advances in neural information processing systems, 25:1097-1105, 2012.

Chin-Yew Lin. Rouge: A package for automatic evaluation of summaries. In Text summarization branches out, pp. 74-81, 2004.

Srikanth Malla, Behzad Dariush, and Chiho Choi. Titan: Future forecast using action priors. In Proceedings of the IEEE/CVF Conference on Computer Vision and Pattern Recognition, pp. 11186-11196, 2020.

Kishore Papineni, Salim Roukos, Todd Ward, and Wei-Jing Zhu. Bleu: a method for automatic evaluation of machine translation. In Proceedings of the 40th annual meeting of the Association for Computational Linguistics, pp. 311-318, 2002.

Bryan A Plummer, Liwei Wang, Chris M Cervantes, Juan C Caicedo, Julia Hockenmaier, and Svetlana Lazebnik. Flickr30k entities: Collecting region-to-phrase correspondences for richer image-to-

(56) References Cited

OTHER PUBLICATIONS sentence models. In Proceedings of the IEEE international conference on computer vision, pp. 2641-2649, 2015.

Steven J Rennie, Etienne Marcheret, Youssef Mroueh, Jerret Ross, and Vaibhava Goel. Self-critical sequence training for image captioning. In Proceedings of the IEEE Conference on Computer Vision and Pattern Recognition, pp. 7008-7024, 2017.

Anna Rohrbach, Marcus Rohrbach, Ronghang Hu, Trevor Darrell, and Bernt Schiele. Grounding of textual phrases in mages by reconstruction. In European Conference on Computer Vision, pp. 817-834. Springer, 2016.

Ashish Vaswani, Noam Shazeer, Niki Parmar, Jakob Uszkoreit, Llion Jones, Aidan N. Gomez, Lukasz Kaiser, and Illia Polosukhin. Attention is all you need. 2017.

Ramakrishna Vedantam, C Lawrence Zitnick, and Devi Parikh. Cider: Consensus-based image description evaluation. In Proceedings of the IEEE conference on computer vision and pattern recognition, pp. 4566-4575, 2015.

Dequan Wang, Coline Devin, Qi-Zhi Cai, Fisher Yu, and Trevor Darrell. Deep object-centric policies for autonomous driving. In 2019 International Conference on Robotics and Automation (ICRA), pp. 8853-8859. IEEE, 2019.

Qingzhong Wang and Antoni B Chan. Towards diverse and accurate image captions via reinforcing determinantal point process. arXiv preprint arXiv:1908.04919, 2019.

Ye Xia, Danqing Zhang, Jinkyu Kim, Ken Nakayama, Karl Zipser, and David Whitney. Predicting driver attention in critical situations. In Asian conference on computer vision, pp. 658-674. Springer, 2018.

Kelvin Xu, Jimmy Ba, Ryan Kiros, Kyunghyun Cho, Aaron Courville, Ruslan Salakhudinov, Rich Zemel, and Yoshua Bengio. Show, attend and tell: Neural image caption generation with visual attention. In International conference on machine learning, pp. 2048-2057. PMLR, 2015.

Linjie Yang, Kevin Tang, Jianchao Yang, and Li-Jia Li. Dense captioning with joint inference and visual context. In Proceedings of the IEEE conference on computer vision and pattern recognition, pp. 2193-2202, 2017.

Yu Yao, Xizi Wang, Mingze Xu, Zelin Pu, Ella Atkins, and David Crandall. When, where, and what? a new dataset for anomaly detection in driving videos. arXiv preprint arXiv:2004.03044, 2020.

Guojun Yin, Lu Sheng, Bin Liu, Nenghai Yu, Xiaogang Wang, and Jing Shao. Context and attribute grounded dense captioning. In Proceedings of the IEEE/CVF Conference on Computer Vision and Pattern Recognition, pp. 6241-6250, 2019.

Lantao Yu, Weinan Zhang, Jun Wang, and Yong Yu. Seqgan: Sequence generative adversarial nets with policy gradient. In Proceedings of the AAAI conference on artificial intelligence, vol. 31, 2017.

Kuo-Hao Zeng, Shih-Han Chou, Fu-Hsiang Chan, Juan Carlos Niebles, and Min Sun. Agent-centric risk assessment: Accident anticipation and risky region localization. In Proceedings of the IEEE Conference on Computer Vision and Pattern Recognition, pp. 2222-2230, 2017.

Fang Zhao, Jianshu Li, Jian Zhao, and Jiashi Feng. Weakly supervised phrase localization with multi-scale anchored transformer network. In Proceedings of the IEEE Conference on Computer Vision and Pattern Recognition, pp. 5696-5705, 2018.

\* cited by examiner

THERE IS A SPEED LIMIT IN FRONT OF THE EGO CAR

THERE IS A CYCLIST WEARING A RED JACKET, CYCLING ACROSS A PEDESTRIAN CROSSING, FROM THE RIGHT SIDE TO THE LEFT SIDE, BECAUSE OF A RED TRAFFIC LIGHT

SYSTEM AND METHOD FOR COMPLETING JOINT RISK LOCALIZATION AND REASONING IN DRIVING SCENARIOS

CROSS-REFERENCE TO RELATED APPLICATION

This application claims priority to U.S. Provisional Application Ser. No. 63/191,581 filed on May 21, 2021, which is expressly incorporated herein by reference.

BACKGROUND

Identifying important objects in driving scenes may be a fundamental element for downstream tasks in advanced driving and advanced driving assistance systems. Situational awareness is an important requirement to achieve high level automation in intelligent vehicles. An important aspect of situational awareness for intelligent mobility is the ability to create an explainable network for the perception of risk from the view-point of a driver and to establish methods to communicate those risks to the driver.

BRIEF DESCRIPTION

According to one aspect, a computer-implemented method for completing joint risk localization and reasoning in driving scenarios that includes receiving a plurality of images associated with a driving scene of an ego agent. The computer-implemented method also includes inputting image data associated with the plurality of images to an encoder. Encoded visual features and encoded optical flow features are extracted from the image data and are concatenated into concatenated features that are associated with the driving scene of the ego agent. The computer-implemented method additionally includes inputting the concatenated features to a decoder that identifies at least one of: an important traffic agent and an important traffic infrastructure that is located within the driving scene of the ego agent. The computer-implemented method further includes controlling at least one system of the ego agent to provide a response to account for the at least one of: the important traffic agent and the important traffic infrastructure that is located within the driving scene of the ego agent.

According to another aspect, a system for completing joint risk localization and reasoning in driving scenarios that includes a memory storing instructions when executed by a processor cause the processor to receive a plurality of images associated with a driving scene of an ego agent. The instructions also cause the processor to input image data associated with the plurality of images to an encoder. Encoded visual features and encoded optical flow features are extracted from the image data and are concatenated into concatenated features that are associated with the driving scene of the ego agent. The instructions additionally cause the processor to input the concatenated features to a decoder that identifies at least one of: an important traffic agent and an important traffic infrastructure that is located within the driving scene of the ego agent. The instructions further cause the processor to control at least one system of the ego agent to provide a response to account for the at least one of: the important traffic agent and the important traffic infrastructure that is located within the driving scene of the ego agent.

According to yet another aspect, a non-transitory computer readable storage medium storing instruction that when executed by a computer, which includes a processor perform a method that includes receiving a plurality of images associated with a driving scene of an ego agent. The computer-implemented method also includes inputting image data associated with the plurality of images to an encoder. Encoded visual features and encoded optical flow features are extracted from the image data and are concatenated into concatenated features that are associated with the driving scene of the ego agent. The computer-implemented method additionally includes inputting the concatenated features to a decoder that identifies at least one of: an important traffic agent and an important traffic infrastructure that is located within the driving scene of the ego agent. The computer-implemented method further includes controlling at least one system of the ego agent to provide a response to account for the at least one of: the important traffic agent and the important traffic infrastructure that is located within the driving scene of the ego agent.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
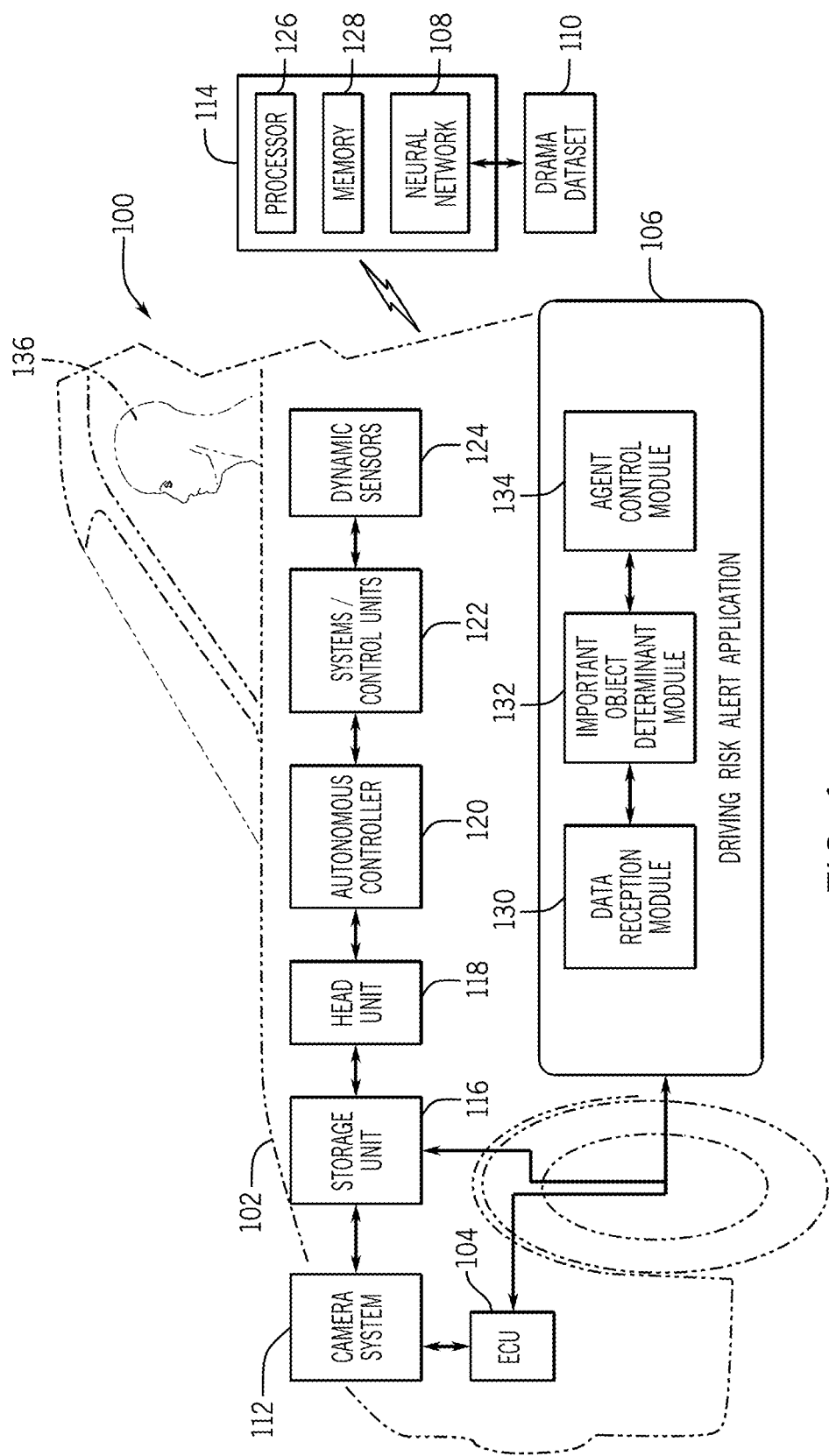
FIG. 1 is a schematic view of an exemplary system for completing joint risk localization and reasoning in driving scenarios according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system for completing joint risk localization and reasoning in driving scenarios according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 that includes an electronic control unit (ECU) 104 that executes one or more applications, operating systems, agent system and subsystem user interfaces, among others. The ECU 104 may also execute a driving risk assessment mechanism and alert application (driving risk alert application) 106 that may be configured to utilize a neural network 108 to analyze a plurality of images associated with a driving scene of the ego agent 102 to identify one or more traffic agents and/or traffic infrastructure.

The ego agent 102 may include, but may not be limited to, a vehicle, a motorcycle, a motorized bicycle/scooter, a construction vehicle, an aircraft, and the like that may be traveling within the driving scene of the ego agent 102 that may include one or more traffic agents. The driving scene of the ego agent 102 may include a predetermined vicinity that may surround the ego agent 102 and may include one or more roadways, pathways, taxiways, and the like upon which the ego agent 102 may be traveling in addition to one or more traffic agents.

The one or more traffic agents may include, but may not be limited to, additional vehicles (e.g., automobiles, trucks, buses), pedestrians, motorcycles, bicycles, scooters, construction/manufacturing vehicles/apparatus (e.g., movable cranes, forklift, bulldozer), aircraft, and the like that may be located within and traveling within the driving scene of the ego agent 102. The driving scene may also include traffic infrastructure that may include, but may not be limited to, traffic lights (e.g., red, green, yellow), traffic signage (e.g., stop sign, yield sign, crosswalk sign), roadway markings (e.g., crosswalk markings, stop markings, lane merge markings), and/or additional roadway attributes (e.g., construction barrels, traffic cones, guardrails, concrete barriers, and the like).

In an exemplary embodiment, the driving risk alert application 106 may be configured to utilize the neural network 108 to analyze a plurality of images associated with the driving scene of the ego agent 102 and determine one or more traffic agents that are to be accounted for as potential driving risks that may affect the operation of the ego agent 102, one or more alternative traffic agents, and/or may potentially overlap with one or more paths of the ego agent 102 at a current time step and/or one or more future time steps. Such traffic agents may be classified as important traffic agents.

The driving risk alert application 106 may also be configured to utilize the neural network 108 to determine traffic infrastructure that is to be accounted for as being associated with potential driving risks that may affect the operation of the ego agent 102 and/or one or more traffic agents that are located within the driving scene at a current time step and/or one or more future time steps. Such traffic infrastructure may be classified as important traffic infrastructure. In particular, potential driving risks may be determined as risks that may require certain driving responses and/or driving maneuvers by the ego agent 102 and/or one or more traffic agents that may affect the operation of the ego agent 102 within the driving scene of the ego agent 102.

As discussed below, the driving risk alert application 106 may be configured to receive the plurality of images of the driving scene in the form of image data that is provided from a camera system 112 of the ego agent 102. In other words, the image data may pertain to a plurality of images of the driving scene of the ego agent 102 that may be captured by one or more cameras (not shown) of the camera system 112 that capture the driving scene of the ego agent 102 (e.g., one or more roadways within a predetermined vicinity of the ego agent 102).

The driving risk alert application 106 may be configured to input the image data to an encoder-decoder structure (shown in FIG. 3) of the neural network 108 to extract visual features and optical flow features from the image data. The visual features and optical flow features may be analyzed to determine attributes that may be associated with traffic agents and traffic infrastructure that are located within the driving scene of the ego agent 102 and the motion of dynamic objects such as traffic agents within the driving scene of the ego agent 102 as determined from the plurality of images at various time steps as encoded features.

As discussed below, the visual features and optical flow features may be concatenated and inputted to a decoder to determine one or more particular traffic agents as important traffic agents that are to be accounted for as potential driving risks within the driving scene of the ego agent 102 and/or to determine particular traffic infrastructure that is located within the driving scene of the ego agent 102 as important traffic infrastructure that is to be accounted for by the ego agent 102 and/or by one or more traffic agents.

The neural network 108 may accordingly provide a dual-layer approach with respect to the analysis and determination of important traffic agents and important traffic infrastructure. A first layer may consider how the ego agent 102 may be affected by one or more traffic agents and/or particular traffic infrastructure to determine the one or more important traffic agents and/or the important traffic infrastructure. For example, the first layer may consider how the ego agent 102 is to slow down and brake to account for a pedestrian that may be crossing the path of the ego agent 102 or a red traffic light that may be ahead of the ego agent 102. A second layer may consider how particular traffic agents may be affected by one another and/or particular traffic infrastructure. For example, the second layer may consider how a particular traffic agent may be affected by another traffic agent that is slowing down ahead of the particular traffic agent.

To determine an understanding of the driving scene using the dual-layer approach, the neural network 108 may access a pre-trained driving risk assessment mechanism with a reasoning module dataset (drama dataset) 112 that may include annotation schema that may be analyzed to provide a plurality of annotations associated with important traffic agents, the important traffic infrastructure, and/or the driving scene of the ego agent 102 that may be relevant to the operation of the ego agent 102 with respect to the determination of important traffic agents and important traffic infrastructure. The neural network 108 may determine bounding boxes for the important traffic agents and/or important traffic infrastructure that may be relevant to the operation of the ego agent 102 and/or that may affect particular traffic agents that may be determined as important traffic agents based on the dual-layer approach.

The neural network 108 may generate captions based on the annotations that are determined based on the data within the drama dataset 110 that may provide descriptions, classifications, categorizations, and recommendations about particular driving scenarios that may be based on questions about risk, intentions of the ego agent 102, scene classification of the driving scene, and driving suggestions. The driving risk alert application 106 may be configured to receive data outputted by the neural network 108 regarding the captions, bounding boxes that are computed for important traffic agents and/or important traffic infrastructure, and may provide one or more visual and/or audio alerts to an operator 136 (e.g., driver) of the ego agent 102 that present the captions that are generated by the neural network 108 based on the annotations.

In one or more embodiments, the captions may provide details to the operator 136 as to important traffic agents and/or important traffic infrastructure that may affect the ego agent 102 at a current time step and/or one or more future time steps and/or how particular traffic agents may be affected by one another and/or particular traffic infrastructure at the current time step and/or one or more future time steps. Such captions may be based on annotation data that is retrieved from the drama dataset 110 based on the decoding of concatenated image flow data.

In an exemplary embodiment, the drama dataset 110 may provide a visual reasoning of driving risks that may be associated with the important traffic agents and/or the important traffic infrastructure included within the driving scene. The neural network 108 may access the drama dataset 110 to analyze the concatenated image flow data with respect to a range of visual reasoning capabilities that are associated with various driving scenarios of the ego agent 102.

Figure 2:
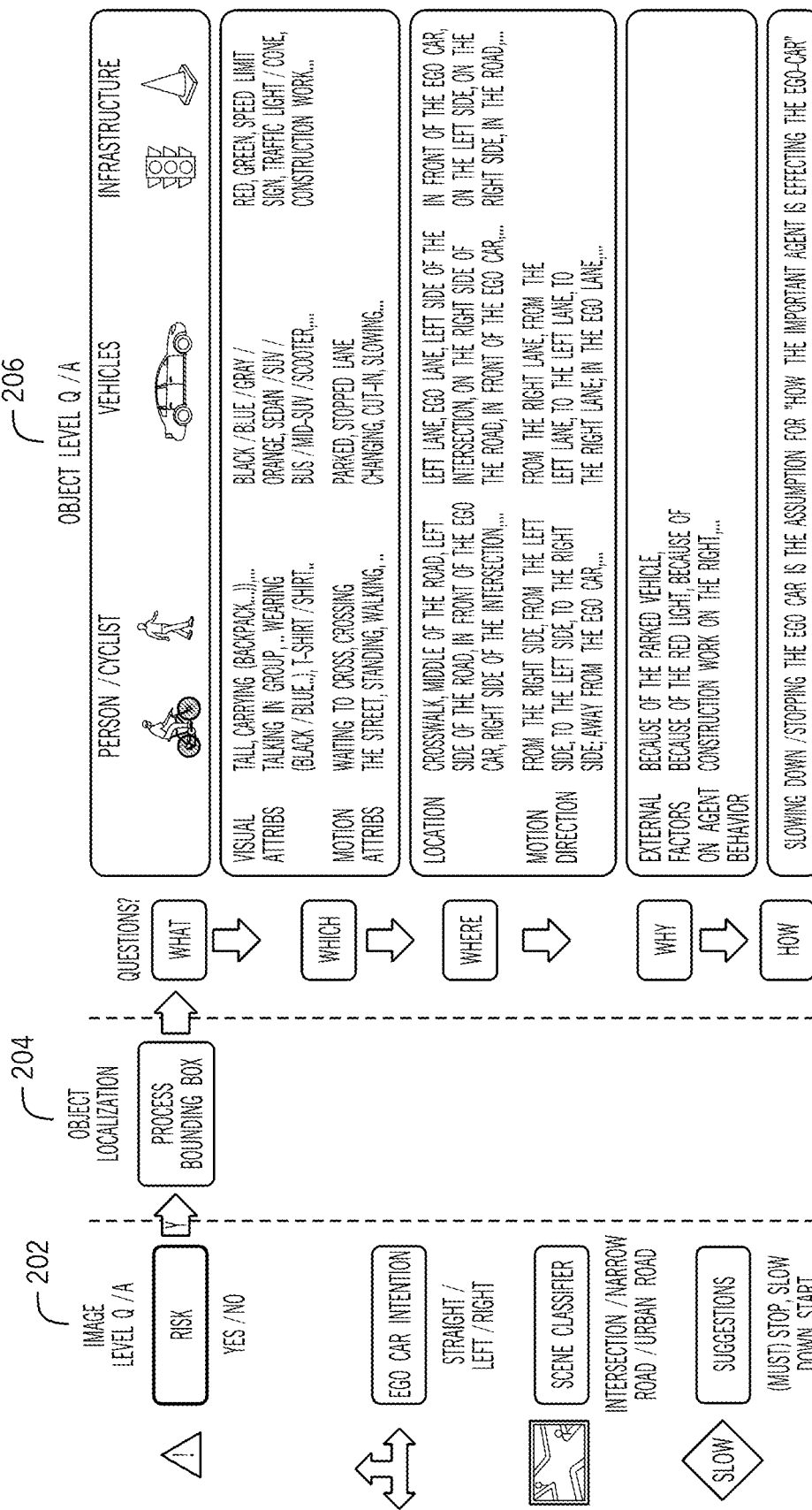
FIG. 2 is an illustrative example of data that is included within a pre-trained driving risk assessment mechanism with a reasoning module dataset according to an exemplary embodiment of the present disclosure.

As shown in the illustrative example of FIG. 2, the drama dataset 110 may include image level Q/A 202 that pertain to image (e.g., video) level questions that may include if a driving risk is prevalent to the ego agent 102, an intention of the ego agent 102 that may be based on dynamic data provided by dynamic sensors 124 of the ego agent 102, a scene classification of the driving scene of the ego agent 102, and one or more suggestions that may be associated with various driving scenarios that are associated with object localization 204 of determined important traffic agents and/or important traffic infrastructure. The image level Q/A 202 may be configured to answer questions that are formatted to address risk and scene attributes as well as ego-behavioral features such as ego-intention and behavioral suggestions. Some questions ask what risks are perceived or what the operator's potential action might be to ease the driving risk. In one configuration, valid answers that may be utilized to provide captions may be included in closed-form such as a Boolean format (i.e., yes or no) or single choice from multiple options (e.g., stop, slow down, start moving, merge, etc.)

As discussed in more detail below, the object localization 204 may be associated with bounding boxes that may be computed around respective important traffic agents and/or important traffic infrastructure. The drama dataset 110 may include object level Q/A 206 that is associated with annotation data that may include object level questions and answers that are associated with traffic agents and/or traffic infrastructure as to visual attributes, motion attributes, locational attributes, motion direction, and external factors that may affect traffic agent behaviors.

In one configuration, if a driving scenario pertaining to the ego agent 102 is determined risky, the object/level questions may be answered based on the object level Q/A 206. The object level Q/A 206 may include elementary operations (what, which, where, why, how) that may structure a question allowing a free-form or open-ended response. In addition to single-choice answers, more complex reasoning may be utilized to represent a high-level semantic understanding from observations. As represented in FIG. 2, example answers are shown that correspond to elementary operations of visual reasoning such as querying object types (what), visual and motion attributes (which), location and motion direction (where), reasoning about risks or description of interactions (why), and effect of relationships (how).

In particular, the drama dataset 110 may include data that pertains to 'what' each important traffic agent/static object is with respect to agent labels. The agent labels may include short descriptions that pertain to each of the traffic agents and/or traffic infrastructure. For example, the agent labels may include pedestrian, cyclist, vehicle, white truck, green scooter, construction worker, child, red traffic light, stop sign, yield sign, crosswalk, and the like.

Data included within the drama dataset 110 may also be analyzed to determine data annotations that pertain to 'which' that include annotations that describe a reasoning based on agent level attributes that may be divided into visual attributes and motion attributes. The visual attributes may describe what the traffic agents and/or traffic infrastructure looks like, (i.e. colors, clothes, objects and activities for person/pedestrian traffic agents, types and colors for vehicle traffic agents, signs/names and states of traffic infrastructure). The motion attributes may describe how each important traffic agent moves. For example, such descriptions may include 'waiting to cross', 'standing (applicable to pedestrian agents), parked, lane changing (applicable to vehicle agents).

The data included within the drama dataset 110 may additionally be analyzed to determine data annotations that pertain 'where' that includes the locations and motion directions of the traffic agents and/or traffic infrastructure located within the driving scene. The locations of important traffic agents are the respective positions of each of the one or more important traffic agents within the driving scene, associated with traffic infrastructure, roadways/pathways of the driving scene, and/or with respect to the position of the ego agent 102 (e.g., intersections or positions related to the ego agent 102). Motion directions may describe "from a location or lane, to another."

Additionally, data included within the drama dataset 110 may be analyzed to determine data annotations that pertain 'why' that describes a cause of the important traffic agent's behavior that may be based on the second layer of the dual-layer approach utilized by the neural network 108 with respect to the determination of important traffic agents and/or important traffic infrastructure. The data included within the drama dataset 110 may additionally be analyzed to determine data annotations that pertain 'how' that describes how each important traffic agent and/or important traffic infrastructure is affecting the ego agent 102.

Accordingly, based on the data output by the decoder of the neural network 108 upon analyzing the drama dataset 110, captions may be output in addition to the processed bounding boxes that describe the one or more important traffic agents and/or traffic infrastructure within the driving scene in addition to image level details, object localization-based details, and object level details. In an exemplary embodiment, the driving risk alert application 106 may provide visual alerts that include the bounding boxes processed by the decoder of the neural network 108. The bounding boxes may be augmented around one or more respective important traffic agents and/or important traffic infrastructure that may be determined by the neural network 108 to match with the captions determined based on the analysis of the drama dataset 110 (as represented in FIG. 7A-FIG. 7D).

The bounding boxes may include important traffic agents and/or important traffic infrastructure and captions that are based on the image level Q/A 202, object localization 204, and object level Q/A 206 that may be determined based on the analysis of the drama dataset 110 through machine learning/deep learning techniques of the neural network 108 to provide the operator 136 with a visual alert that specifically pertains to the presence, position, description, and importance of the particular traffic agent and/or traffic infrastructure to capture the operator's attention regarding potential driving risks and with suggestions on how to counter each of the potential driving risks.

In one or more embodiments, the driving risk alert application 106 may provide audio alerts. The audio alerts may be based on the captions to provide the operator 136 with an alert that specifically pertains to the presence, position, description, and importance of the particular traffic agent and/or traffic infrastructure to capture the operator's attention regarding potential driving risks and to provide the operator 136 with one or more driving suggestions to navigate the ego agent 102 to account for one or more driving risks. For example, captions may be stated aloud through an audio system (not shown) of the ego agent 102 to the operator 136 to provide the operator an alert that specifically pertains to the presence, position, description, and importance of the particular traffic agent and/or traffic infrastructure and to provide the operator 136 with one or more driving suggestions to navigate the ego agent 102 to account for one or more driving risks.

In some configurations, the audio alerts may be accompanied by one/two-word short description visual alerts that may be augmented near the bounding boxes to alert the operator 136 with respect to the one or more driving suggestions to navigate the ego agent 102. In some embodiments, the driving risk alert application 106 may be configured to provide autonomous control commands that may be utilized to provide agent autonomous controls that may be associated with the ego agent 102 to account for one or more important traffic agents and/or important traffic infrastructure. In some cases, the autonomous control commands may be based on the one or more driving suggestions included within the captions to supplement one or more visual alerts and/or audio alerts that may be provided to the operator 136 of the ego agent 102 to account for potential driving risks within the driving scene of the ego agent 102.

In one embodiment, the driving risk alert application 106 may be also be configured to populate that drama dataset 110 with supplemental data that may be associated with various types of important traffic agents and/or important traffic infrastructure as determined by the neural network 108. Accordingly, the drama dataset 110 may be continually populated with updated data to continually train the neural network 108 with data that may be utilized to fine tune determinations of important traffic agents and/or important traffic infrastructure. The neural network 108 may also be continually trained to fine tune captions associated with the important traffic agents, important traffic infrastructure, and the driving scene of the ego agent 102 at one or more future points in time to be utilized during future iterations of encoding and decoding for the purpose of enabling the ego agent 102 to account for potential driving risks within the driving scene of the ego agent 102.

The driving risk alert application 106 may be configured to provide an improvement to the technology of important agent localization, important traffic infrastructure localization, captioning, and visual question answering tasks to provide a natural language description of important traffic agents and/or important traffic infrastructure using visual alerts, audio alerts, and/or accounting for them through autonomous commands to complete joint risk localization and reasoning in various driving scenarios. This functionality may thereby be utilized to apply a range of visual reasoning capabilities to counteract potential driving risks in various driving scenarios that may be based on different driving scenes at various points in time.

With continued reference to FIG. 1, the ECU 104 may be configured to be operably connected to a plurality of additional components of the ego agent 102, including, but not limited to, the camera system 112, a storage unit 116, a head unit 118, an autonomous controller 120, systems/control units 122, and dynamic sensors 124. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego agent 102.

The ECU 104 may also include a communication device (not shown) for sending data internally within (e.g., between one or more components) the ego agent 102 and communicating with externally hosted computing systems (e.g., external to the ego agent 102). Generally, the ECU 104 may communicate with the storage unit 116 to execute the one or more applications, operating systems, system and subsystem user interfaces, and the like that are stored within the storage unit 116.

In an exemplary, one or more commands may be provided to control one or more advanced driver assist systems (ADAS) (not shown) of the ego agent 102 that may be operated by the operator 136 to provide one or more visual alerts and/or audio alerts through the head unit 118 of the ego agent 102. The head unit 118 may be operably connected to the systems/control units 122 of the ego agent 102. For example, the head unit 118 may be operably connected to the audio system of the ego agent 102 to provide one or more audio alerts that may include captions that are provided to the operator 136 based on commands communicated from the driving risk alert application 106. The head unit 118 may also be operably connected to one or more display units (not shown). The head unit 118 may be configured to receive commands from the driving risk alert application 106 to provide one or more visual alerts that may present bounding boxes that are computed around one or more important traffic agents and/or important traffic infrastructure.

In one or more embodiments, the one or more display units may be configured in a variety of form factors, shapes, sizes, designs, and/or configurations. For example, one or more display units may be configured flat panel display that may include a liquid crystal display (LCD) device that is included within a center stack, a dashboard, and/or one or more front and/or rear portions of the ego agent 102. In some embodiments, the one or more display units may include a heads up display that projects one or more visual alerts provided by the driving risk alert application 106 upon the windshield of the ego agent 102.

In one embodiment, the ECU 104 may communicate with the autonomous controller 120 to execute autonomous driving commands to operate the ego agent 102 to be fully autonomously driven or semi-autonomously driven in a particular manner. As discussed, the autonomous driving commands may be based on commands provided by the driving risk alert application 106 to provide agent autonomous controls that may be associated with the ego agent 102 to navigate the ego agent 102 within the surrounding environment to account for one or more important traffic agents and/or important traffic infrastructure. The autonomous driving commands may be based on commands provided by the driving risk alert application 106 to navigate the ego agent 102 within the surrounding environment to autonomously control one or more functions of the ego agent 102 to travel within the surrounding environment based on captions and data annotations that may be provided by the neural network 108 based on the analysis of the drama dataset 110.

In one configuration, one or more commands may be provided to one or more systems/control units 122 that include, but are not limited to an engine control unit, a braking control unit, a transmission control unit, a steering control unit, and the like to control the ego agent 102 to be autonomously driven based on one or more autonomous commands that are output by the driving risk alert application 106 to navigate the ego agent 102 within the driving scene of the ego agent 102. In particular, one or more functions of the ego agent 102 may be autonomously controlled to travel within the driving scene in a manner that may be based on the one or more driving suggestions included within the captions to supplement one or more visual alerts and/or audio alerts to account for potential driving risks within the driving scene of the ego agent 102.

In one or more embodiments, the systems/control units 122 may be operably connected to the dynamic sensors 124 of the ego agent 102. The dynamic sensors 124 may be configured to receive inputs from one or more systems, sub-systems, control systems, and the like. In one embodiment, the dynamic sensors 124 may be included as part of a Controller Area Network (CAN) of the ego agent 102 and may be configured to provide dynamic data to the ECU 104 to be utilized for one or more systems, sub-systems, control systems, and the like. The dynamic sensors 124 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic sensors 124 may provide dynamic data in the form of one or more values (e.g., numeric levels) that are associated with the real-time dynamic performance of the ego agent 102 as one or more driving maneuvers are conducted and/or as the ego agent 102 is controlled to be autonomously driven. As discussed below, dynamic data that is output by the dynamic sensors 124 may be associated with a real time dynamic operation of the ego agent 102 as it is traveling within the driving scene. The dynamic data may be provided to the neural network 108 to be analyzed to determine an intention of the ego agent 102. The intention of the ego agent 102 may pertain to an intended trajectory of the ego agent 102 and one or more positions and/or locations of the ego agent 102 at one or more future time steps within the driving scene. The intention of the ego agent 102 may be determined based on the speed, steering angle, braking rate, and the like of the ego agent 102.

With continued reference to FIG. 1, the camera system 112 of the ego agent 102 may include one or more of the cameras (not shown) that may be positioned in one or more directions and at one or more areas to capture one or more images of the driving scene of the ego agent 102 (e.g., images of the roadway on which the ego agent 102 is traveling). The one or more cameras of the camera system 112 may be disposed at external front portions of the ego agent 102, including, but not limited to different portions of a dashboard, a bumper, front lighting units, fenders, and a windshield. In one embodiment, the one or more cameras may be configured as RGB cameras that may capture RGB bands that are configured to capture rich information about object appearance that pertain to roadway lane markings, roadway/pathway markers, and/or roadway/pathway infrastructure (e.g., guardrails).

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the current location of the ego agent 102 from the perspective of the ego agent 102. In one embodiment, the camera system 112 may be configured to convert one or more RGB images/videos (e.g., sequences of images) into image data that is communicated to the driving risk alert application 106 to be analyzed.

As discussed below, image data provided by the camera system 112 may be provided to the driving risk alert application 106 to be inputted to the neural network 108. Accordingly, the encoder of the neural network 108 may extract visual features and optical flow features from the image data to determine attributes that may be associated with traffic agents and traffic infrastructure that are located within the driving scene of the ego agent 102 and the motion of dynamic objects such as traffic agents within the driving scene of the ego agent 102 as determined from the plurality of images at various time steps as encoded features.

In one embodiment, the neural network 108 may be hosted upon an external server 114 that may be owned, operated, and/or managed by an OEM, a third-party administrator, and/or a dataset manager that manages data that is associated with the operation of the driving risk alert application 106. The external server 114 may be operably controlled by a processor 126 that may be configured to execute the driving risk alert application 106. In particular, the processor 126 may be configured to execute one or more applications, operating systems, database, and the like. The processor 126 may also include internal processing memory, an interface circuit, and bus lines for transferring data, sending commands, and communicating with the plurality of components of the external server 114.

In one embodiment, the processor 126 may be operably connected to a memory 128 of the external server 114. Generally, the processor 126 may communicate with the memory 128 to execute the one or more applications, operating systems, and the like that are stored within the memory 128. In one embodiment, the memory 128 may store one or more executable application files that are associated with the driving risk alert application 106.

Figure 3:
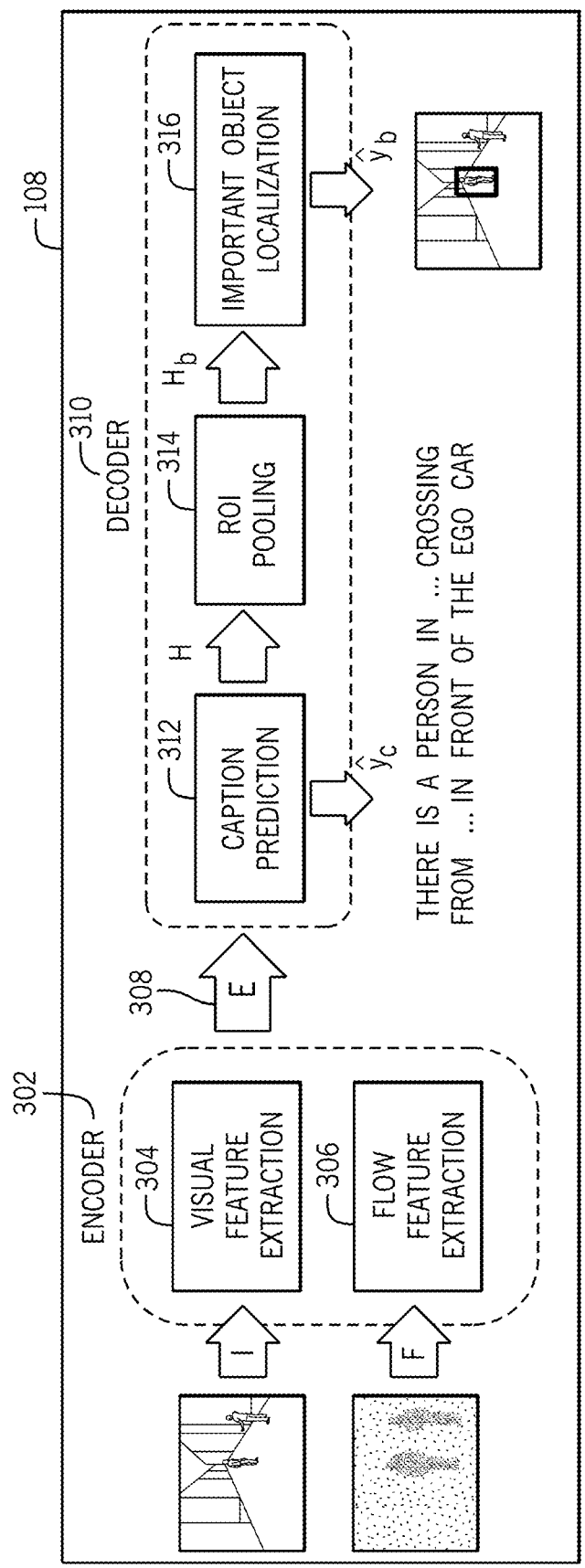
FIG. 3 is a schematic overview of an encoder-decoder structure of a neural network according to an exemplary embodiment of the present disclosure.

In an exemplary embodiment, the external server 114 may be configured to store the neural network 108. The neural network 108 may be configured as a long short-term memory recurrent neural network (LSTM neural network). As an LSTM neural network, the neural network 108 may execute machine learning/deep learning techniques to process and analyze sequences of data points such as a plurality of images and video to output classifications and make predictions based on time series data. As shown in FIG. 3, the neural network 108 may include the encoder 302 and the decoder 310. As discussed in more detail below, the encoder 302 may be utilized to encode visual features and optical flow features based on image data inputted from the camera system 112 of the ego agent 102.

The decoder 310 may be configured to determine important traffic agents and/or important traffic infrastructure within the driving scene, compute bounding boxes around the important traffic agents and/or important traffic infrastructure, and generate corresponding captions based on retrieval and analysis of data included within the drama dataset 110. As discussed above, the captions may provide details to the operator 136 as to important traffic agents and/or important traffic infrastructure that may affect the ego agent 102 at a current time step and/or one or more future time steps and/or how particular traffic agents may be affected by one another and/or particular traffic infrastructure at the current time step and/or one or more future time steps.

II. The Driving Risk Alert Application and Related Methods

Components of the driving risk alert application 106 will now be described according to an exemplary embodiment and with continued reference to FIG. 1. In an exemplary embodiment, the driving risk alert application 106 may be stored on the storage unit 116 and executed by the ECU 104 of the ego agent 102. In another embodiment, the driving risk alert application 106 may be stored on the memory 128 of the external server 114 and may be accessed by a telematics control unit of the ego agent 102 to be executed by the ECU 104 of the ego agent 102.

The general functionality of the driving risk alert application 106 will now be discussed. In an exemplary embodiment, the driving risk alert application 106 may include a plurality of modules 130-134 that may be configured to complete joint risk localization and reasoning in driving scenarios. The plurality of modules 130-134 may include a data reception module 130, an important object determinant module 132, and an agent control module 134. However, it is appreciated that the driving risk alert application 106 may include one or more additional modules and/or sub-modules that are included in lieu of the modules 130-134.

Figure 4:
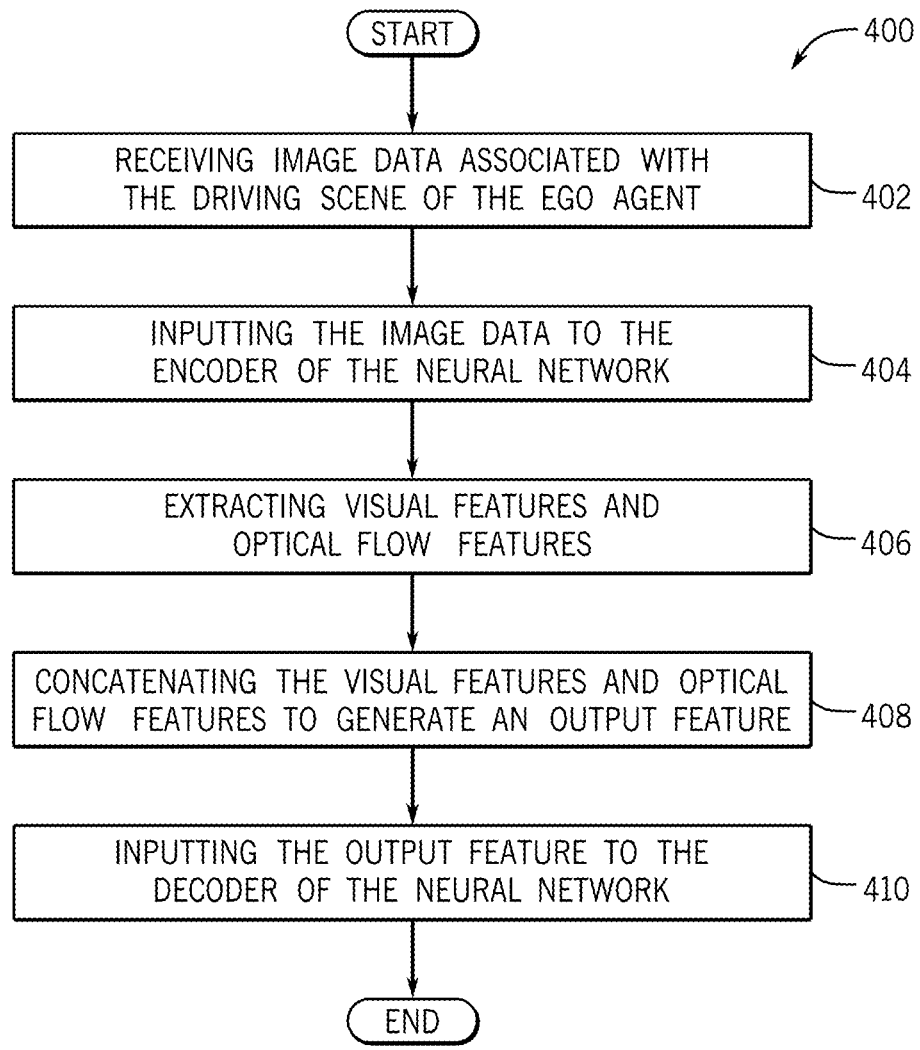
FIG. 4 is a process flow diagram of a method for utilizing an encoder of the neural network to output concatenated image flow data to a decoder of the neural network according to an exemplary embodiment of the present disclosure.

FIG. 4 is a process flow diagram of a method 400 for utilizing the encoder 302 of the neural network 108 to output concatenated image flow data to the decoder 310 of the neural network 108 according to an exemplary embodiment of the present disclosure. FIG. 4 will be described with reference to the components of FIG. 1 and FIG. 3 though it is to be appreciated that the method 400 of FIG. 4 may be used with other systems/components. The method 400 may begin at block 402, wherein the method 400 may include receiving image data associated with the driving scene of the ego agent 102.

In an exemplary embodiment, at one or more past time steps and/or at a current time step, the data reception module 130 of the driving risk alert application 106 may be configured to communicate with the camera system 112 to collect image data associated with untrimmed images/video of the driving scene of the ego agent 102 at a plurality of time steps (at past time steps and at the current time step) of the ego agent 102.

In some configurations, the image data may pertain to one or more first person viewpoint RGB images/videos of the driving scene of the ego agent 102 captured at particular time steps. The image data may be configured to include rich information about object appearance that pertain to roadway lane markings, roadway/pathway markers, roadway/pathway infrastructure within the driving scene of the ego agent 102 at one or more time steps. In some embodiments, the data reception module 130 may package and store the image data on the storage unit 116 to be evaluated at one or more points in time.

The method 400 may proceed to block 404, wherein the method 400 may include inputting the image data to the encoder 302 of the neural network 108. In an exemplary embodiment, upon receiving the image data associated with the driving scene of the ego agent 102, the data reception module 130 may be configured to communicate the image data to the important object determinant module 132 of the driving risk alert application 106.

In one embodiment, the important object determinant module 132 may be configured to analyze the image data and may extract image-based feature data I that includes image attributes and features of the driving scene of the ego agent 102. The image attributes and features may pertain to visual aspects of the driving scene that may be included within each of a plurality of pixels of each of the images and/or video captured at each time step of the driving scene of the ego agent 102. Such visual attributes may include objects that may affect the ego agent 102 such as one or more traffic agents that are located within the driving scene and/or traffic infrastructure that may be located within the driving scene. Additionally, the visual attributes may include environmental information that may pertain to the configuration of roadways, lanes, natural features (e.g., hills, trees), and/or man-made features (buildings, concrete barrier) that may be located within the driving scene.

The important object determinant module 132 may additionally be configured to analyze the image data and may extract optical flow feature data F that may pertain to a motion over a plurality of time steps (e.g., past time steps until a current time step) on a respective image plane included within the plurality of pixels of each of the plurality of images and/or video captured at each time step of the driving scene of the ego agent 102. The optical flow feature data may capture an apparent change of motion of dynamic objects such as respective traffic agents between two or more consecutive frames (associated with respective time steps) caused by the movement of respective traffic agents.

As represented in FIG. 3, the important object determinant module 132 may be configured to access the neural network 108 stored upon the external server 114 to input the image-based feature data I and the optical flow feature data F to the encoder 302 of the neural network 108 to be analyzed using machine learning/deep learning techniques. With continued reference to FIG. 3 and FIG. 4, the method 400 of FIG. 4 may proceed to block 406, wherein the method 400 may include extracting visual features and optical flow features.

In an exemplary embodiment, the encoder 302 of the neural network 108 may be configured to perform visual feature extraction 304 on the image-based feature data I that is inputted to the encoder 302 using a visual feature encoder. The encoder 302 may also be configured to perform flow feature extraction 306 on the optical flow feature data F that is inputted to the encoder 302 using an optical flow feature encoder. In particular, given each image $I_t$ associated with the image-based feature data I and each optical flow image $F_t$ at time step t, the encoder 302 may be configured to extract the visual flow features through visual feature extraction 304 and optical flow features through flow feature extraction 306. In one configuration, each optical flow image $F_t$ may be generated by Flownet 2.0 with two image frames $I_t$ and to capture the motion of objects such as traffic agents within the driving scene of the ego agent 102.

In one embodiment, to encode the visual features and the optical flow features, the encoder 302 may utilize a ResNet-101 model that is pre-trained on Imagenet as a backbone network. Both features are extracted from two layers prior to the original ResNet-101 structure, and the adaptive average pooling layer added to get a fixed embedding size of 14×14×2048 as outputs.

Upon performance of the visual feature extraction 304 and the flow feature extraction 306, the method 400 may proceed to block 408, wherein the method 400 may include concatenating the visual features and optical flow features to generate an output feature. In an exemplary embodiment, the encoder 302 may be configured to concatenate the image flow features extracted from the image-based feature data I through visual feature extraction 304 and the optical flow features extracted from the optical flow data F. The image flow features and the optical flow features may be concatenated to generate concatenated image flow data $E_t$ as an output feature. In particular, the image flow features and the optical flow features may be concatenated as $E_t=[\Phi_v(I_t), \Phi_f(F_t)]$.

The method 400 may proceed to block 410, wherein the method 400 may include inputting the output feature to the decoder 310 of the neural network 108. In an exemplary embodiment, the neural network 108 may be configured to input the concatenated image flow data as the output feature $E_t$ of the encoder 302 to the decoder 310. As discussed below, the decoder 310 may be configured to determine one or more particular traffic agents as important traffic agents that are to be accounted for as potential driving risks within the driving scene of the ego agent 102 and/or to determine particular traffic infrastructure that is located within the driving scene of the ego agent 102 that is to be accounted for by the ego agent 102 and/or is accounted for by one or more traffic agents.

Figure 5:
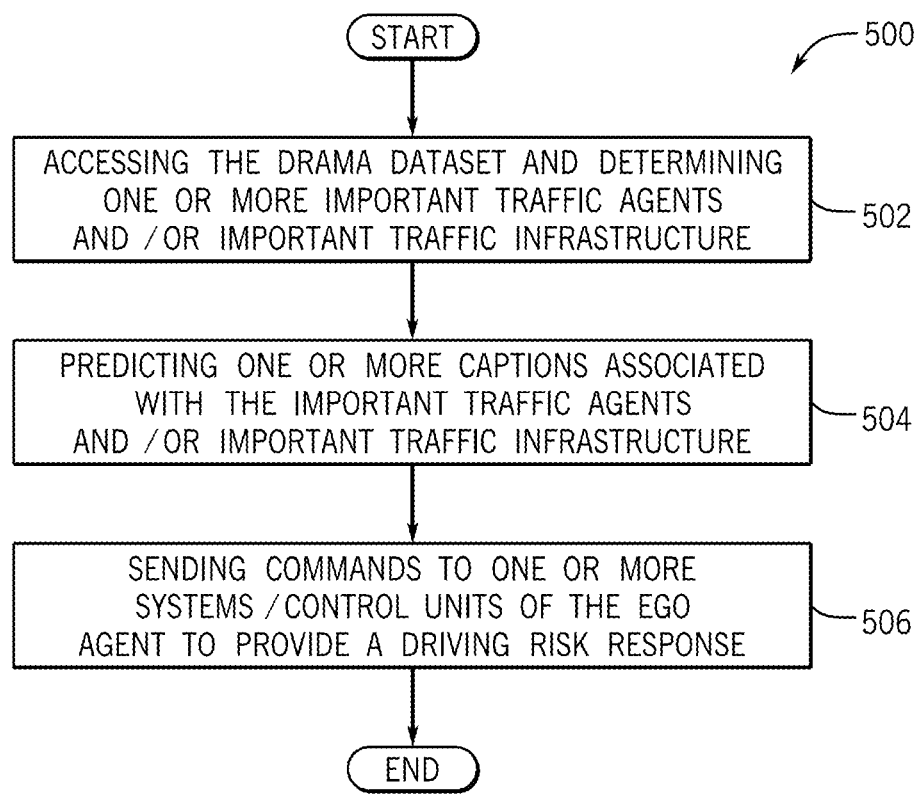
FIG. 5 is a process flow diagram of a method for decoding concatenated image flow data and providing a driving risk response associated with one or more important traffic agents and/or important traffic infrastructure that is located within a driving scene of an ego agent according to an exemplary embodiment of the present disclosure.

FIG. 5 is a process flow diagram of a method 500 for decoding concatenated image flow data and providing a driving risk response associated with one or more important traffic agents and/or important traffic infrastructure that is located within the driving scene of the ego agent 102 according to an exemplary embodiment of the present disclosure. FIG. 5 will be described with reference to the components of FIG. 1 and FIG. 3 though it is to be appreciated that the method 500 of FIG. 5 may be used with other systems/components.

The method 500 may begin at block 502, wherein the method 500 may include accessing the drama dataset 110 and determining one or more important traffic agents and/or important traffic infrastructure. In an exemplary embodiment, the decoder 310 may be configured to decode the concatenated image flow data E to complete caption prediction 312 and ROI pooling 314 may be executed to improve the performance of caption decoding for each computed bounding box.

Important object localization 316 may be utilized to identify important traffic agents and/or important traffic infrastructure and compute respective bounding boxes based on analysis of the drama dataset 110. The bounding boxes may include important traffic agents and/or important traffic infrastructure and captions that are based on the image level Q/A 202, object localization 204, and object level Q/A 206 that may be determined based on the analysis of the drama dataset 110 through machine learning/deep learning techniques of the neural network 108

In one configuration, a basic multi-layer perceptron (MLP) may be utilized for the important object localization model. The architecture of an important object localization module of the decoder 310 that performs that important object localization 316 is similar to an MLP layer regressing to bounding box. The important object localization 316 pertains to decoding of bounding boxes that are computed around one or more important traffic agents and/or important traffic infrastructure that may affect the ego agent 102 at a current time step and/or one or more future time steps. Accordingly, bounding boxes $\hat{y}_b$ are predicted and computed for each of the important traffic agents and/or important traffic infrastructure where the inputs are resnet features (E) or self-attention features ($H_b$).

The method 500 may proceed to block 504, wherein the method 500 may include predicting one or more captions associated with the important traffic agents and/or important traffic infrastructure. In one embodiment, the decoder 310 may be configured to decode, predict, and generate captions based on the annotations that are determined based on the data within the drama dataset 110 that may provide descriptions, classifications, categorizations, and recommendations about particular driving scenarios that may be based on questions about risk, intentions of the ego agent 102, scene classification of the driving scene, and driving suggestions.

In one embodiment, the decoder 310 predicts the caption where the inputs are resnet features (E) or ROI pooled features ($E_a$) depending on the architecture of the decoder 310. The ROI pooling 314 may be completed after the important object localization 316 for improving the caption prediction. The ROI pooling 314 may be completed to determine important traffic agent and important traffic infrastructure features ($E_a$, $E_i$) from the encoded global features of the driving scene E to a fixed size tensor using the predicted bounding box $\hat{y}_b$ that is generated though important object localization. The agent's features $E_a$ and/or traffic infrastructure features $E_i$ are concatenated with the global scene features E, $H_c=[E_a, E_i, \varphi(E)]$ and fed as input to a captioning decoder of the neural network 108 that competes the caption prediction 312 based on the analysis of the drama dataset 110. The recurrent captioning decoder converts the $H_c$ to the initial hidden state $h_0=\mathcal{H}(H_c)$ and recurrently decodes the caption. $\varphi$ is MLP layer which is different at different instances.

As shown in the illustrative examples of FIG. 6A-FIG. 6D, the captions may be based on annotations that are provided based on the visual scenarios that are included within the drama dataset 110 that may be based on each important traffic agent's features $E_a$ and/or important traffic infrastructure features $E_i$ that are concatenated with the global scene features E, $H_c=[E_a, E_i, \varphi(E)]$. Accordingly, annotations that pertain to risk, the intention of the ego agent 102 that may be based on dynamic data provided the dynamic sensors 124, attributes of the driving scene of the ego agent 102 (e.g., type of roadway), and one or more suggestions may be provided.

Additionally, annotations associated with elementary operations of visual reasoning such as querying object types (what), visual and motion attributes (which), location and motion direction (where), reasoning about risks or description of interactions (why), and effect of relationships (how) may be determined. Accordingly, predicted captions may be generated that may be based on the annotations. In some embodiments, as shown in FIG. 6A-FIG. 6B the captions may be generated as sentences that are based on the annotations retrieved from the drama dataset 110.

Figure 6A:
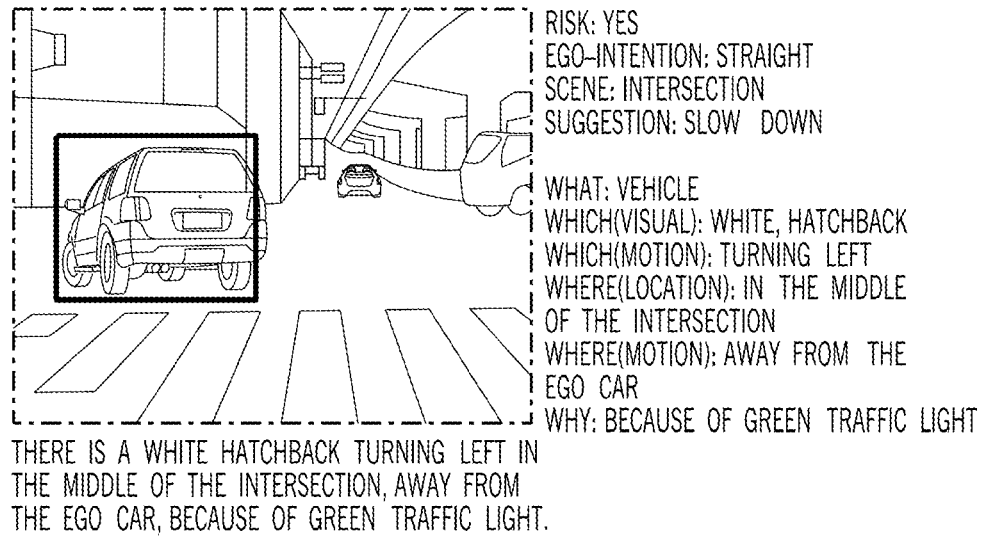
FIG. 6A is an illustrative example of a plurality of annotations that are analyzed for a particular driving scenario according to an exemplary embodiment of the present disclosure.
Figure 6B:
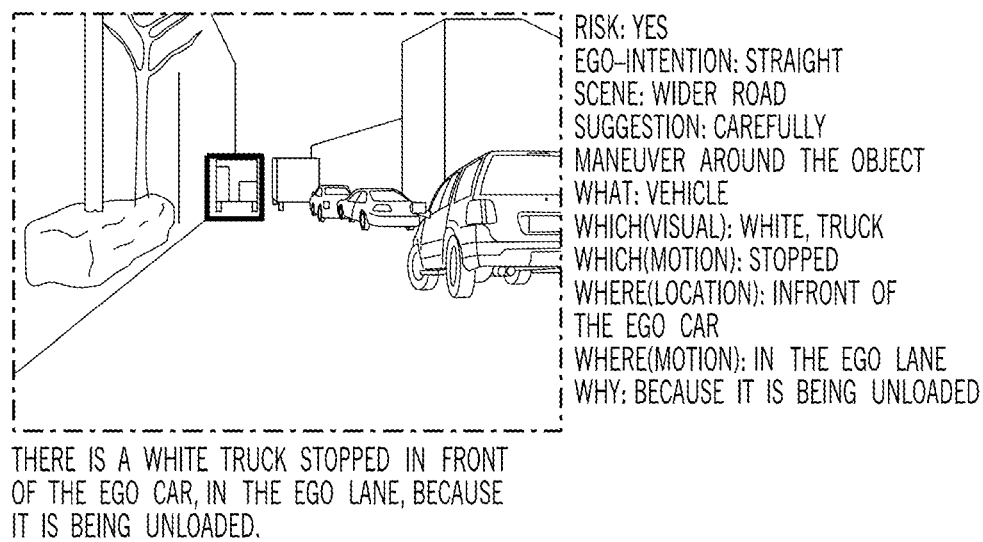
FIG. 6B is an illustrative example of a plurality of annotations that are analyzed for a particular driving scenario according to an exemplary embodiment of the present disclosure.
Figure 6C:
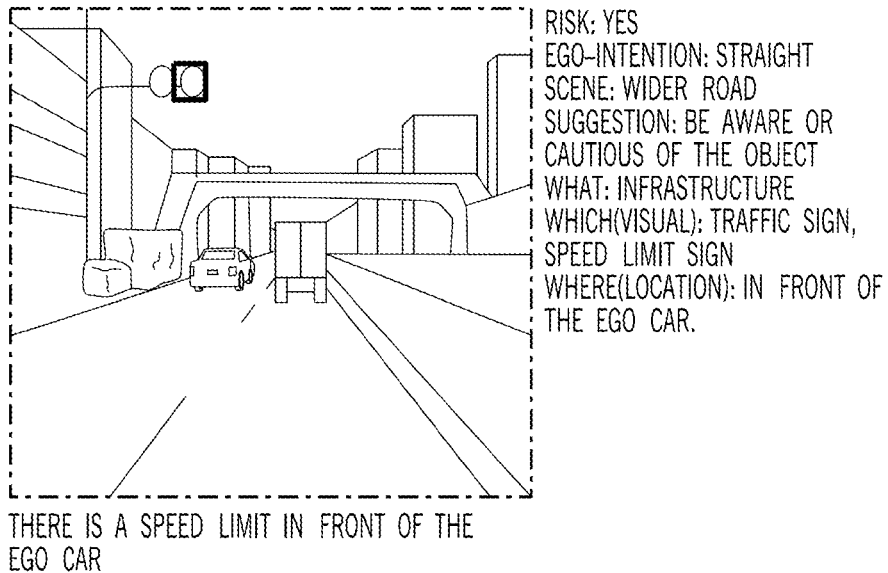
FIG. 6C is an illustrative example of a plurality of annotations that are analyzed for a particular driving scenario according to an exemplary embodiment of the present disclosure.
Figure 6D:
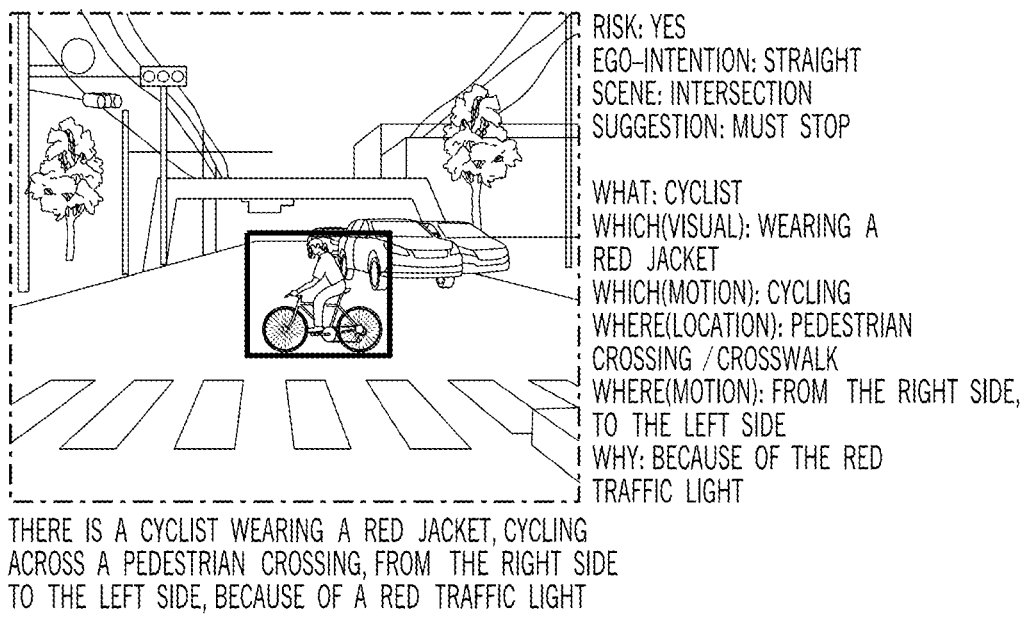
FIG. 6D is an illustrative example of a plurality of annotations that are analyzed for a particular driving scenario according to an exemplary embodiment of the present disclosure.
Figure 7A:
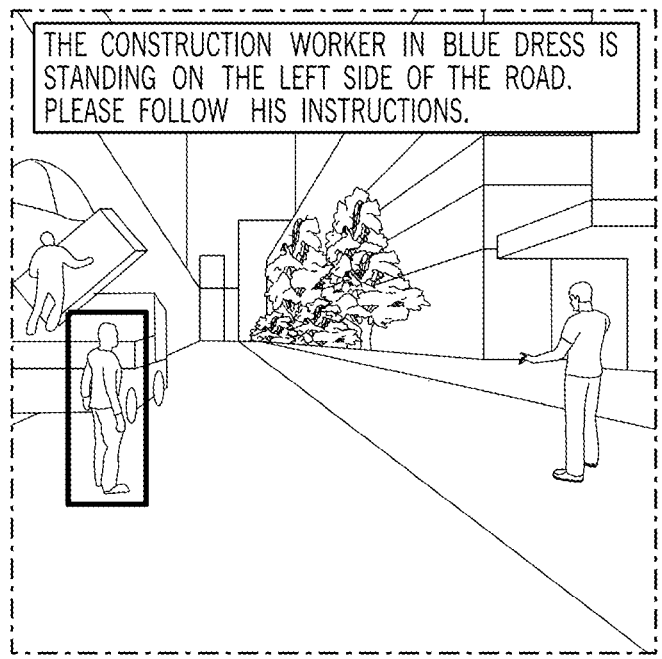
FIG. 7A is an illustrative example of a presentation of bounding boxes that may be determined by the neural network to match with the captions according to exemplary embodiment of the present disclosure.
Figure 7B:
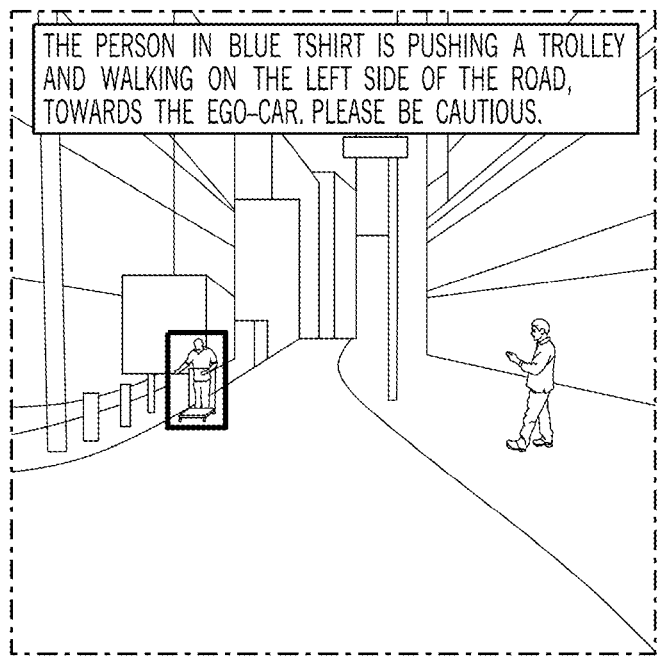
FIG. 7B is an illustrative example of a presentation of bounding boxes that may be determined by the neural network to match with the captions according to exemplary embodiment of the present disclosure.
Figure 7C:
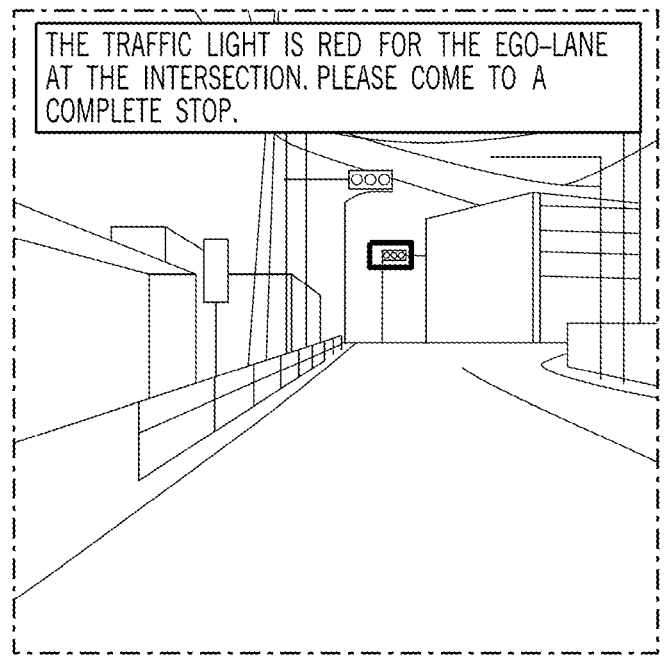
FIG. 7C is an illustrative example of a presentation of bounding boxes that may be determined by the neural network to match with the captions according to exemplary embodiment of the present disclosure.
Figure 7D:
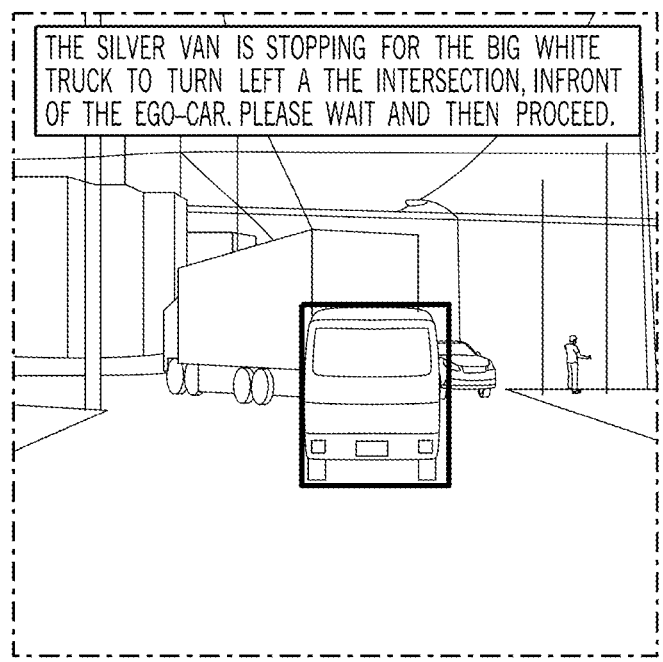
FIG. 7D is an illustrative example of a presentation of bounding boxes that may be determined by the neural network to match with the captions according to exemplary embodiment of the present disclosure.

As shown in FIG. 6A-FIG. 6D, the captions based on the annotations may be provided in a format that pertains to the dual-layer approach with respect to the analysis and determination of important traffic agents and important traffic infrastructure. The first layer may consider how the ego agent 102 may be affected by one or more traffic agents and/or particular traffic infrastructure to determine the one or more important traffic agents and/or the important traffic infrastructure. For example, as shown in FIG. 6A, the first layer may consider how the ego agent 102 is to slow down and brake to account for a white hatchback traffic agent that is turning left in the middle of an intersection as its crossing the path of the ego agent 102. A second layer may consider how particular traffic agents may be affected by one another and/or particular traffic infrastructure. For example, as shown in FIG. 6D the second layer may consider how a particular traffic agent cyclist may be affected by traffic infrastructure of a red traffic light.

In an exemplary embodiment, the decoder 310 of the neural network 108 may be configured to output data associated with the one or more generated bounding boxes $\hat{y}_b$ that are predicted and computed for each of the important traffic agents and/or important traffic infrastructure and one or more generated predicted captions to the important object determinant module 132 of the driving risk alert application 106. The important object determinant module 132 may be configured to communicate respective data regarding the bounding boxes and the captions to the agent control module 134 of the driving risk alert application 106.

With continued reference to FIG. 5, the method 500 may proceed to block 506, wherein the method 500 may include sending commands to one or more systems/control units of the ego agent 102 to provide a driving risk response. In an exemplary embodiment, the agent control module 134 may be configured to analyze the data outputted by the neural network 108 regarding the captions, bounding boxes that are computed for important traffic agents and/or important traffic infrastructure, and may communicate one or more commands to the ECU 104, the head unit 118, the systems/control units 122 and/or the autonomous controller 120 of the ego agent 102 to provide a driving risk response.

In one embodiment, the driving risk response may be provided in the form of the visual alerts that include the bounding boxes processed by the decoder 310 of the neural network 108. As shown in the illustrative examples of FIG. 7A to FIG. 7D in one embodiment, one or more display units of the ego agent 102 may be utilized to present bounding boxes that may be computed and augmented around one or more respective important traffic agents and/or important traffic infrastructure that may be determined by the neural network 108 to match with the captions determined based on the analysis of the drama dataset 110. The captions may provide details to the operator 136 as to important traffic agents and/or important traffic infrastructure that may affect the ego agent 102 at a current time step and/or one or more future time steps and/or how particular traffic agents may be affected by one another and/or particular traffic infrastructure at the current time step and/or one or more future time steps.

In some configurations, the agent control module 134 may be configured to send one or more commands to the systems/control units 122 to provide audio alerts may be based on the captions. For example, with reference to FIG. 7C, the caption: "The traffic light is red for the ego-lane at the intersection . . . . Please come to a complete stop" may be stated aloud through the audio system of the ego agent 102 to the operator 136 to provide the operator an alert that specifically pertains to the presence, position, description, and importance of the particular traffic agent and/or traffic infrastructure that is presented upon a display unit within a respective bounding box. This functionality may provide the operator 136 with one or more driving suggestions to navigate the ego agent 102 to account for one or more driving risks.

In some configurations, the audio alerts may be accompanied by one/two-word short description visual alerts that may be augmented near the bounding boxes to alert the operator 136 with respect to the one or more driving suggestions to navigate the ego agent 102. In one or more embodiments, the driving risk alert application 106 may be configured to provide autonomous control commands that may be utilized to provide agent autonomous controls that may be associated with the ego agent 102 to account for one or more important traffic agents and/or important traffic infrastructure. In some cases, the autonomous control commands may be based on the one or more driving suggestions included within the captions to supplement one or more visual alerts and/or audio alerts that may be provided to the operator 136 of the ego agent 102 to account for potential driving risks within the driving scene of the ego agent 102.

Figure 8:
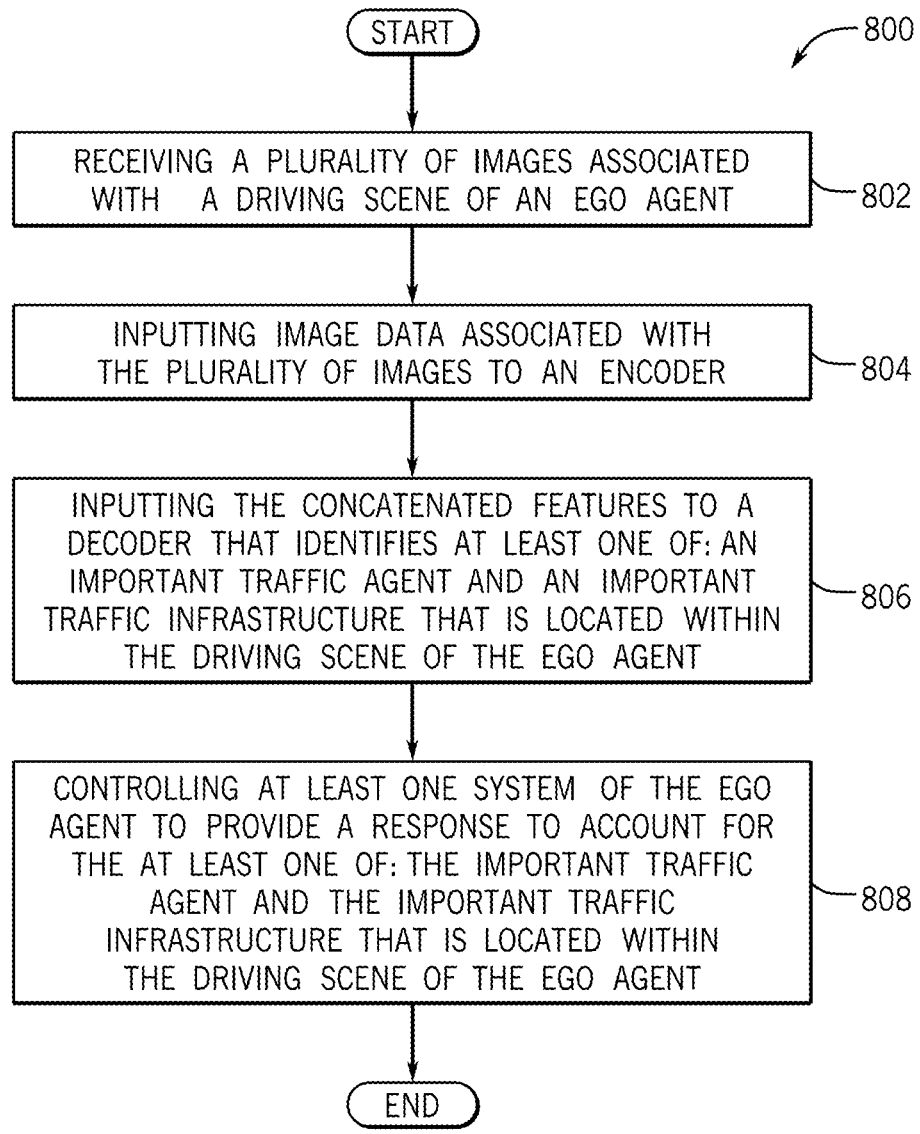
FIG. 8 is a process flow diagram of a method for completing joint risk localization and reasoning in driving scenarios according to an exemplary embodiment of the present disclosure.

FIG. 8 is a process flow diagram of a method 800 for completing joint risk localization and reasoning in driving scenarios according to an exemplary embodiment of the present disclosure. FIG. 8 will be described with reference to the components of FIG. 1 and FIG. 3 though it is to be appreciated that the method 500 of FIG. 8 may be used with other systems/components. The method 800 may begin at block 802, wherein the method 800 may include receiving a plurality of images associated with a driving scene of an ego agent 102.

The method 800 may proceed to block 804, wherein the method 800 may include inputting the image data associated with the plurality of images an encoder 302. In one embodiment, encoded visual features and optical flow features are extracted from the image data and are concatenated into concatenated features that are associated with the driving scene of the ego agent 102. The method 800 may proceed to block 806, wherein the method 800 includes inputting the concatenated features to a decoder 310 that identifies at least one of: an important traffic agent and an important traffic infrastructure that is located within the driving scene of the ego agent 102. The method 800 may proceed to block 808, wherein the method 800 may include controlling at least one system of the ego agent 102 to provide a response to account for the at least one of: the important traffic agent and the important traffic infrastructure that is located within the driving scene of the ego agent 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for completing joint risk localization and reasoning in driving scenarios comprising: receiving a plurality of images associated with a driving scene of an ego agent; inputting image data associated with the plurality of images to an encoder, wherein encoded visual features and encoded optical flow features are extracted from the image data and are concatenated into concatenated features that are associated with the driving scene of the ego agent; inputting the concatenated features to a decoder; identifying, by the decoder, based on the concatenated features, at least one of: an important traffic agent and an important traffic infrastructure that is located within the driving scene of the ego agent, out of a plurality of traffic agents, a plurality of traffic infrastructures or a combination of the plurality of traffic agents and the plurality of traffic infrastructures within the driving scene of the ego agent, wherein the important traffic agent is to be accounted for as potential driving risks that affect an operation of the ego agent and/or one or more alternative traffic agents, and/or potentially overlap with one or more paths of the ego agent at a current time step and/or one or more future time steps, and the important traffic infrastructure is to be accounted for as being associated with potential driving risks that affect the operation of the ego agent and/or one or more traffic agents that are located within the driving scene at the current time step and/or one or more future time steps; and controlling at least one system of the ego agent to provide a response to account for the at least one of: the important traffic agent and the important traffic infrastructure that is located within the driving scene of the ego agent, wherein the decoder is configured to decode the concatenated features to predict and generate captions that are based on a plurality of annotations associated with traffic agents, traffic infrastructure, image level questions and answers, object localization, and object level questions and answers, wherein the captions provide descriptions, classifications, categorizations, and recommendations about particular driving scenarios that are based on questions about risk, intentions of the ego agent, scene classification of the driving scene, and driving suggestions pertaining to a position of the at least one of: the important traffic agent and the important traffic infrastructure.

2. The computer-implemented method of claim 1, wherein the encoded visual features include image attributes and features of the driving scene of the ego agent, wherein the image attributes and features pertain to visual aspects of the driving scene that are included within each of a plurality of pixels of each of the plurality of images captured at each time step of the driving scene.

3. The computer-implemented method of claim 2, wherein the encoded optical flow features pertain to a motion of objects included within the driving scene over a plurality of time steps, wherein the encoded optical flow features capture an apparent change of motion of traffic agents between two or more consecutive image frames caused by a movement of the traffic agents.

4. The computer-implemented method of claim 1, wherein the decoder accesses a pre-trained driving risk assessment mechanism with a drama dataset that includes annotation schema that is analyzed to provide the plurality of annotations associated with the traffic agents, the traffic infrastructure, the image level questions and answers, the object localization, and the object level questions and answers.

5. The computer-implemented method of claim 4, wherein inputting the concatenated features to the decoder includes accessing the drama dataset and identifying the at least one of: the important traffic agent and the important traffic infrastructure that is located within the driving scene of the ego agent based on the plurality of annotations included within the drama dataset.

6. The computer-implemented method of claim 4, wherein traffic agent features associated with each traffic agent that is located within the driving scene and traffic infrastructure features associated with each traffic infrastructure that is located within the driving scene are concatenated with encoded global scene features, wherein the captions are based on the plurality of annotations that are included within the drama dataset that are based on the concatenation of traffic agent features and traffic infrastructure features with the encoded global scene features.

7. The computer-implemented method of claim 6, wherein controlling at least one system of the ego agent to provide the response includes controlling a display unit of the ego agent to present at least one bounding box that is computed and augmented around at least one of: the important traffic agent and the important traffic infrastructure that is located within the driving scene of the ego agent to match with the captions determined based on an analysis of the drama dataset.

8. The computer-implemented method of claim 6, wherein controlling at least one system of the ego agent to provide the response includes controlling an audio system of the ego agent to provide an alert that specifically pertains to a presence, position, description, and importance of at least one: the important traffic agent and the important traffic infrastructure based on the captions, wherein the captions include driving suggestions to navigate the ego agent with respect to the at least one: the important traffic agent and the important traffic infrastructure.

9. A system for completing joint risk localization and reasoning in driving scenarios comprising: a memory storing instructions when executed by a processor cause the processor to: receive a plurality of images associated with a driving scene of an ego agent; input image data associated with the plurality of images to an encoder, wherein encoded visual features and encoded optical flow features are extracted from the image data and are concatenated into concatenated features that are associated with the driving scene of the ego agent; input the concatenated features to a decoder; identify, by the decoder, based on the concatenated features, at least one of: an important traffic agent and an important traffic infrastructure that is located within the driving scene of the ego agent, out of a plurality of traffic agents, a plurality of traffic infrastructures or a combination of the plurality of traffic agents and the plurality of traffic infrastructures within the driving scene of the ego agent, wherein the important traffic agent is to be accounted for as potential driving risks that affect an operation of the ego agent and/or one or more alternative traffic agents, and/or potentially overlap with one or more paths of the ego agent at a current time step and/or one or more future time steps, and the important traffic infrastructure is to be accounted for as being associated with potential driving risks that affect the operation of the ego agent and/or one or more traffic agents that are located within the driving scene at the current time step and/or one or more future time steps; and control at least one system of the ego agent to provide a response to account for the at least one of: the important traffic agent and the important traffic infrastructure that is located within the driving scene of the ego agent, wherein the decoder is configured to decode the concatenated features to predict and generate captions that are based on a plurality of annotations associated with traffic agents, traffic infrastructure, image level questions and answers, object localization, and object level questions and answers, wherein the captions provide descriptions, classifications, categorizations, and recommendations about particular driving scenarios that are based on questions about risk, intentions of the ego agent, scene classification of the driving scene, and driving suggestions pertaining to a position of the at least one of: the important traffic agent and the important traffic infrastructure.

10. The system of claim 9, wherein the encoded visual features include image attributes and features of the driving scene of the ego agent, wherein the image attributes and features pertain to visual aspects of the driving scene that are included within each of a plurality of pixels of each of the plurality of images captured at each time step of the driving scene.

11. The system of claim 10, wherein the encoded optical flow features pertain to a motion of objects included within the driving scene over a plurality of time steps, wherein the encoded optical flow features capture an apparent change of motion of traffic agents between two or more consecutive image frames caused by a movement of the traffic agents.

12. The system of claim 9, wherein the decoder accesses a pre-trained driving risk assessment mechanism with a drama dataset that includes annotation schema that is analyzed to provide the plurality of annotations associated with the traffic agents, the traffic infrastructure, the image level questions and answers, the object localization, and the object level questions and answers.

13. The system of claim 12, wherein inputting the concatenated features to the decoder includes accessing the drama dataset and identifying the at least one of: the important traffic agent and the important traffic infrastructure that is located within the driving scene of the ego agent based on the plurality of annotations included within the drama dataset.

14. The system of claim 12, wherein traffic agent features associated with each traffic agent that is located within the driving scene and traffic infrastructure features associated with each traffic infrastructure that is located within the driving scene are concatenated with encoded global scene features, wherein the captions are based on the plurality of annotations that are included within the drama dataset that are based on the concatenation of traffic agent features and traffic infrastructure features with the encoded global scene features.

15. The system of claim 14, wherein controlling at least one system of the ego agent to provide the response includes controlling a display unit of the ego agent to present at least one bounding box that is computed and augmented around at least one of: the important traffic agent and the important traffic infrastructure that is located within the driving scene of the ego agent to match with the captions determined based on an analysis of the drama dataset.

16. The system of claim 14, wherein controlling at least one system of the ego agent to provide the response includes controlling an audio system of the ego agent to provide an alert that specifically pertains to a presence, position, description, and importance of at least one: the important traffic agent and the important traffic infrastructure based on the captions, wherein the captions include driving suggestions to navigate the ego agent with respect to the at least one: the important traffic agent and the important traffic infrastructure.

17. A non-transitory computer readable storage medium storing instruction that when executed by a computer, which includes a processor perform a method, the method comprising: receiving a plurality of images associated with a driving scene of an ego agent; inputting image data associated with the plurality of images to an encoder, wherein encoded visual features and encoded optical flow features are extracted from the image data and are concatenated into concatenated features that are associated with the driving scene of the ego agent; inputting the concatenated features to a decoder; identifying, by the decoder, based on the concatenated features, at least one of: an important traffic agent and an important traffic infrastructure that is located within the driving scene of the ego agent, out of a plurality of traffic agents, a plurality of traffic infrastructures or a combination of the plurality of traffic agents and the plurality of traffic infrastructures within the driving scene of the ego agent, wherein the important traffic agent is to be accounted for as potential driving risks that affect an operation of the ego agent and/or one or more alternative traffic agents, and/or potentially overlap with one or more paths of the ego agent at a current time step and/or one or more future time steps, and the important traffic infrastructure is to be accounted for as being associated with potential driving risks that affect the operation of the ego agent and/or one or more traffic agents that are located within the driving scene at the current time step and/or one or more future time steps; and controlling at least one system of the ego agent to provide a response to account for the at least one of: the important traffic agent and the important traffic infrastructure that is located within the driving scene of the ego agent, wherein the decoder is configured to decode the concatenated features to predict and generate captions that are based on a plurality of annotations associated with traffic agents, traffic infrastructure, image level questions and answers, object localization, and object level questions and answers, wherein the captions provide descriptions, classifications, categorizations, and recommendations about particular driving scenarios that are based on questions about risk, intentions of the ego agent, scene classification of the driving scene, and driving suggestions pertaining to a position of the at least one of: the important traffic agent and the important traffic infrastructure.

18. The non-transitory computer readable storage medium of claim 17, wherein controlling at least one system of the ego agent to provide the response includes controlling an audio system of the ego agent to provide an alert that specifically pertains to a presence, position, description, and importance of the at least one: the important traffic agent and the important traffic infrastructure based on captions, wherein the captions include driving suggestions to navigate the ego agent with respect to at least one: the important traffic agent and the important traffic infrastructure.

\* \* \* \* \*